3,738,851
WAX EMULSION

William Harding Jarvis, Coleford, England, assignor to Ragosine Oil Company Limited, London, England
No Drawing. Filed Apr. 6, 1971, Ser. No. 131,787
Claims priority, application Great Britain, Apr. 6, 1970, 16,232/70
Int. Cl. C09d 5/08
U.S. Cl. 106—14      11 Claims

ABSTRACT OF THE DISCLOSURE

An emulsion containing an aqueous continuous phase, a normally solid wax in the disperse phase, an emulsifying agent and a corrosion inhibitor has been found to be useful for coating the inside of containers in order to prevent deterioration of sensitive materials, such as latex, stored or transported in such containers. The emulsion may also be used to coat the stanchions holding motor cars and the like during their spraying; this enables any paint inadvertently sprayed on the stanchions to be readily stripped off. Furthermore, the emulsion-deposited coating can easily be removed by a non-acidic wash.

---

The present invention relates to improved wax emulsions and especially to wax emulsions which are suitable for coating tanks intended for the transport or storage of sensitive material, such as latex, especially natural rubber latex. The emulsions are also useful for coating the metal support members used to support articles, such as motor cars and the like, during painting, e.g. by spray painting. During such painting operations, it is almost impossible to avoid depositing some paint upon the support members and it is desirable that the deposited paint should be easily removable. We have now discovered that, if the wax emulsion of the present invention is first applied to these support members, the paint may thereafter be readily stripped off.

Large amounts of latex are shipped from the rubber-producing countries every year and are normally transported in metal, generally steel, tanks in the cargo holds of ships or in substantially similar tanks in rail or road transport. However, it is difficult to remove the latex from a tank without leaving at least a skin of latex behind. Also, direct content of the latex and steel leads to rusting, which discolours the latex. It has therefore been found from practical experience that it is necessary to provide a barrier between the steel tank and the latex and the most convenient material for forming this barrier has been found to be a wax, especially the paraffin waxes.

Until now, the only effective method of providing the desired wax coating has been to apply a molten wax to the inside surfaces of the tank and then allow this to solidify. This method is, however, inconvenient, uneconomical, wasteful of man-power, difficult to use effectively and, moreover, provides a coating which can only be removed with some considerable difficulty. It is necessary that the wax coating should be easily removable since the vessels carrying the rubber latex to its destination will normally return carrying a different cargo and this cago may not require wax-coated containers; indeed, such wax-coated containers may even be positively harmful to certain cargoes.

The basis of the present invention is the discovery that a certain wax emulsion may be applied to the inside surfaces of the container and allowed to dry, thereby providing a satisfactory wax coating which is both cheap and easy to apply. It has, moreover, the very considerable advantage that a wax coating applied from an emulsion is easily removable. The emulsion-applied coating may, for example, be removed by washing with a non-acidic aqueous fluid, especially an aqueous alkaline solution. Although we do not wish to be limited by any particular theory, it is believed that the emulsion lays down a film which is macroscopically continuous but microscopically discontinuous (i.e. made up of minute contacting and adhering particles of wax). As opposed to this, the film laid down by applying molten wax is both macroscopically and microscopically continuous. Thus, while the emulsion-applied coating forms an effective barrier to the latex, because of some inherent incompatibility between the wax and latex, the coating is sufficiently porous for the aqueous wash fluid readily to penetrate the coating, thereby disintegrating it and removing it from the container wall. This theory has not, however, as yet been verified.

The application of this emulsion-applied coating has the further advantage that it provides a protective barrier which prevents contamination and preserves the surfaces of tanks and stowage spaces. This protection permits cleaning of the tanks or stowage spaces to take place at the time of discharge of the cargo when such cleaning would be most effective, thereby maintaining the condition of the surfaces until use at some later period.

Thus, the present invention consists in a wax emulsion comprising: an aqueous continuous phase; a normally solid wax in the disperse phase; an emulsifying agent; and a corrosion inhibitor. The corrosion inhibitor is a material which, when an emulsion containing it is applied to a metal, e.g. copper, brass, aluminium, iron or steel surface, will prevent or reduce the corrosion that would be produced by the application to a similar surface of an otherwise similar emulsion which does not contain the corrosion inhibitor. It will therefore be understood that the precise chemical nature of the corrosion inhibitor is of less importance than its function, provided that the corrosion inhibitor is compatible with the remaining ingredients of the emulsion. The corrosion inhibitor is necessary to prevent corrosion of the container walls, which are usually made of steel but which may be made of other metals, since such corrosion would not only damage the walls but would also have an adverse effect on the material in the container, e.g. the latex.

The invention further consists in a method of providing a protective coating on a metallic substrate, which method comprises applying to said substrate a macroscopically substantially continuous film of the emulsion of the present invention and evaporating the water of said emulsion. The metallic substrate may, for example, be the inner surfaces of a container suitable for carrying a sensitive material such as latex; alternatively, the substrate may be a support member used during the painting of motor cars and the like.

As the wax, we prefer to use paraffin wax, although the ptrticular grade of paraffin wax is largely unimportant; even microcrystalline wax may be used. Although we require that a normally solid wax be used, it is possible to use a mixture of a normally solid wax and a normally liquid wax or oil such that the mixture is normally solid. It is clear that, when the wax has been applied as a coating from the emulsion, it should remain solid during use and should not melt and run off the substrate. Accordingly, the practical minimum melting point of the wax is determined by the maximum ambient temperature likely to be encountered by the wax during its use as a coating. In most circumstances, the minimum useful melting point would be 30° C. As will be seen later, the maximum melting point acceptable is largely determined by the conditions of manufacture of the emulsion. In fact, for convenience in manufacture, the maximum melting point of the wax should be below the boiling point of water at atmospheric pressure. Thus, the wax should preferably have a melting point less than 100° C. However, we have found that the rather higher melting point waxes tend to crystallise before the emulsion is formed and, accordingly, we would normally prefer to use a wax having a melting point not greater than 80° C. A more preferred melting point would be from 50 to 55° C. and we have found that a wax having a melting point of about 55° C. is commercially most acceptable. In addition to the ordinary paraffin waxes, one may also use chlorinated paraffin waxes, such as cerechlor. An example of a high melting point wax which may be used is Nibren 88 which is preferably used in admixture with a lower melting point wax, e.g. 55° C. paraffin wax, preferably in an amount of 25% by weight Nibren and 75% by weight paraffin wax.

The amount of wax to be used will depend upon various factors, such as the density of coating desired which, in turn, will be partly determined by the method by which the coating is to be applied. There should, of course, be sufficient wax in the emulsion to provide an effective coating. We have found that the amount of wax to be used will generally be such that the weight ratio of wax to water in the emulsion is from 2 or 3:1 to 1:10, although towards the higher water content end of this range, the emulsion may be too thin for many purposes. A more preferred range is from 2:1 to 1:3 and, in practice, we use a weight ratio of wax to water of about 0.55:1.

The emulsifying agent is preferably used in an amount such as to give a weight ratio of emulsifying agent to wax of from 1:10 to 1:2; more preferably from 1:6 to 1:4. In practice, we normally use a ratio of emulsifying agent to wax of about 1:5. Examples of suitable emulsifying agents include polyethylene glycol-fatty alcohol condensates, polyethylene glycol esters of fatty acids and propylene glycol esters of fatty acids. Suitable fatty acids are oleic acid, stearic acid, lauric acid and ricinoleic acid. Examples of these are polyethylene glycol 400 monostearate, polyethylene glycol 300 monoleate, polyethylene glycol tri, di and mono ricinoleates, propylene glycol monolaurate, and propylene glycol monostearate. The polyethylene glycol ricinoleates are preferably used in association with an emulsion stabilizer such as lanolin or lanolin fatty acids. Polyoxyethylene glycol ethers (in particular the cetyl ether) are also useful as emulsifying agents. The Ethylan series of emulsifying agents are also suitable, e.g. Ethylan LD, Ethylan 77 and Ethylan CA.

There is no criticality as regards the quantity of corrosion inhibitor used: obviously, at least sufficient must be used to have a significant effect and too much would be uneconomical. We normally use an amount sufficient to give a corrosion inhibitor: water weight ratio not less than 1:200 and generally from 1:10 to 1:100, more preferably from 1:30 to 1:75. In practice, a weight ratio of about 1:50 is generally found to be optimum. A most effective corrosion inhibitor comprises a mixture of sodium nitrite and sodium benzoate (e.g. the mixture of 10% sodium nitrite and 90% sodium benzoate sold under the name "Sobenite"). Also, organic salts of benzoic acid and cinnamic acids, especially benzyl benzoate, and the amino-based corrosion inhibitors, such as that known as Edwin Cooper E010, are effective. If benzyl benzoate is used, it is preferably dissolved in the wax before the emulsion is prepared. If the mixture of sodium nitrite and sodium benzoate is used, it is preferably dissolved in the water before the emulsion is prepared.

It is also highly desirable to add to the emulsion a bactericide or fungicide, especially when the emulsion is to be used to coat the inner surfaces of containers for the storage or transport of latex, since this will prevent the growth of bacteria and fungi, which would be detrimental to the latex. The most satisfactory fungicides and bactericides are the substituted or unsubstituted o-phenylphenols or water-soluble salts thereof, such as Dowicide 1 or Topanol O. Compounds which exhibit bactericidal and fungicidal properties include the following:

o-phenylphenol (Dowicide 1)
2,4,5-trichlorophenol (Dowicide 2)
2,4,6-trichlorophenol (Dowicide 2S)
2-chloro-4-phenylphenol (Dowicide 4)
pentachlorophenol (Dowicide 7)
o-phenylphenol sodium salt tetrahydrate (Dowicide A)
2,4,5-trichlorophenol sodium salt hemitrihydrate (Dowicide B)
pentachlorophenol sodium salt monohydrate (Dowicide G)
N-(3-chloroallyl) hexaminium chloride (Dowicide Q)
2,4,6-trichlorophenol sodium salt monohydrate
dichlorophene
dichloroxylenol (DCMX)

Examples of fungicides include:

2,3,4,6-tetrachlorophenol (Dowicide 6)
2,4,5,6-tetrachlorophenol
cis-N-[(1,1,2,2-tetrachloroethyl)thio]-4-cyclohexene-1,2-dicarboximide
lime-sulphur solution
organic mercurials
formaldehyde
dinitro compounds
quaternary ammonium derivatives, e.g. the alkyl imidazolinium chlorides known as "Quaternary O."

Clearly, not all of these bactericides and/or fungicides would be suitable for all purposes and, accordingly, the particular bactericide or fungicide to be used should be chosen having regard to the proposed use of the wax emulsion.

Once again, there is no criticality as regards the amounts of bactericide or fungicide to be used, but one should obviously use sufficient to be effective and quantities greater than the effective amount are increasingly uneconomical. We normally use sufficient bactericide and/or fungicide that the weight ratio of bactericide and/or fungicide to water is from 1:500 to 1:5,000, more preferably from 1:1,000 to 1:4,000. In practice, a bactericide and/or fungicide:water ratio of about 1:2,500 is used.

It will generally be desirable to incorporate into the emulsion an emulsion stabilizer. We have indicated above that when polyethylene glycol ricinoleates are used as the emulsifying agent, an emulsion stabilizer, such as lanolin or a lanolin fatty acid, is necessary. Other emulsion stabilizers are fatty acid salts of sodium, potassium, morpholine, triethanolamine, borax or any other suitable alkali. Suitable fatty acids include stearic acid, oleic acid and lauric acid. We prefer that the soap (emulsion stabilizer) should be made "in situ": thus, the fatty acid may be dissolved in the wax and the alkali dissolved in the water, the two being then mixed together to produce the emulsion and simultaneously to produce the emulsion stabilizer. The amount of emulsion stabilizer used is preferably such that the ratio of emulsion stabilizer to emulsifying agent is from 1:5 to 1:20, preferably about 1:9, however, the amount to be used should be varied depending upon the particular emulsifying agent and wax in the emulsion.

The nature of the emulsion produced will vary to a certain extent depending on the particular soap used as emulsion stabilizer. For example, the use of a soap from lauric acid and morpholine will give a much thinner emulsion than will the use of a soap from stearic acid and caustic soda, other things being equal. It is not necessary that the emulsion stabilizer should remain in the final emulsion and it may be effectively removed by acidifying with, for example, formic or acetic acid.

The viscosity of the emulsion is preferably from 90 to 750 centistokes. Eumlsions having viscosities towards the lower end of this range, i.e. 90–100 centistokes, are especially useful for application to the stanchions holding motor cars during their paint spraying.

Under some conditions, especially in hot climates, it may be desirable that the wax coating should be harder than is provided by the ingredients listed above. In such a case, we prefer to add a polyethylene oxide to the mixture.

The polyethylene oxide is preferably added in an amount sufficient to provide a weight ratio of polyethylene oxide to emulsion of from 1:100 to 1:450, more preferably from 1:200 to 1:350 and most preferably about 1:280. The polyethylene oxide is preferably used in the form of an aqueous solution, in which the weight ratio of polyethylene oxide to water is from 1:20 to 1:100, more, preferably from 1:50 to 1:70 and most preferably about 1:59. If this additional polyethylene oxide solution is used, the emulsion will contain a greater proportion of water and the preferred weight ratio of wax to water will then be about 1:2.6, the preferred weight ratio of corrosion inhibitor to water will be about 1:71 and the preferred weight ratio of bactericide or fungicide to water will be about 1:3, 530. As well as the advantage of increased hardness the addition of polyethylene oxide produces a thixotropic emulsion having a slightly tacky nature, which is easier to apply. The polyethylene oxide used preferably has a molecular weight greater than 100,000 and it may be as high as 3 to 4 million, although we generally use a polyethylene oxide having a molecular weight of about 2.5 million.

The emulsion is preferably prepared by mixing the wax, the emulsifying agent, the fatty acid part of the emulsion stabilizer, if used, and the bactericide, if used, together, mixing the water, the corrosion inhibitor and the alkali part of the emulsion stabilizer, if used, together and then mixing the wax phase and the water phase. The water phase is preferably added to the wax phase, with stirring, at a temperature above the melting point of the wax, but below the boiling point of water: a temperature of from 80 to 99° C., preferably about 90° C., is satisfactory. If polyethylene oxide is to be incorporated into the emulsion, this is preferably separately dissolved in an appropriate amount of water and the emulsion prepared above is then added to it, again at a temperature above the melting point of wax but below the boiling point of water, such as 80–99° C., preferably about 90° C.

One disadvantage of the emulsion prepared as above is that, once it has dried, the coating is highly translucent and it is therefore extremely difficult to see if it has been properly applied. It may, therefore, be desired to add a filler or pigment to the emulsion in order that it may be more clearly seen. It will be understood that the filler or pigment chosen must be such that it does not attack the emulsion or the latex and, indeed, these criteria must be applied to all the ingredients of the emulsion. A suitable filler is diatomaceous earth or asbestine and a suitable pigment is titanium dioxide. However, when titanium dioxide is used, it is generally necessary to increase the quantity of polyethylene oxide, in order to improve the suspension. Lithopone has been found to attack the emulsion and cannot therefore be used. A dyestuff such as Williams' Water Green, Williams' Water Blue, Williams' Water Red or Williams' Oil Red may be used in association with the filler. It is necessary that the pigment should not "bleed" into the latex. If a pigment is used, an amount of up to 1% by weight is added; if a filler is used, the amount is up to 5% by weight, these percentages being based on the total solids content of the emulsion.

After the emulsion has been applied to the substrate and the substrate has been used, it may be desired to remove the emulsion-applied coating. This may be done by washing the coating with a non-acidic aqueous fluid. The wash fluid is preferably slightly alkaline, rather than neutral and thus should have a pH greater than 7, with a pH greater than 8 being preferred. For greatest convenience, a wash fluid with a pH of 10–12 is used. It has been found that, when fluids having a low, but still alkaline, pH are used, they are best used hot, but with higher pH fluids, the coating will wash off in the cold.

The invention is further illustrated with reference to the following examples.

EXAMPLE 1

1,350 lb. of paraffin wax (melting point 55° C.), 270 lb. of a polyethylene glycol-fatty alcohol condensate (Collone A.C.), 27 lb. of stearic acid and 1 lb. of o-phenylphenol (Dowicide 1) were melted together at a temperature between 90 and 95° C. This is the wax phase.

4 lb. of caustic soda and 50 lb. of Sobenite (a mixture of sodium nitrite and sodium benzoate) were dissolved in 2,498 lb. of water. This water solution was then added, slowly at first, to the wax phase prepared above, at a temperature of about 90° C. This mixture was stirred continuously during the addition and towards the end of the addition of the aqueous solution, the speed of addition was increased. Stirring was continued while the emulsion cooled.

20 lb. of polyethylene oxide (Polyox Coagulant) were dissolved in 1,180 lb. of water and the solution was heated to about 90° C. To this were added 5,600 lb. of a wax emulsion prepared as above, with vigorous stirring.

This wax emulsion was applied by spraying to the inside of a steel container used for the transport of latex. After rubber latex had been carried in the container, no discolouration of the latex was observed and there was no corrosion or contamination of the steel of the container. When the latex had been removed from the container, the coating was also removed by washing it with water having a pH of 8.2 and a temperature of 36–40° C. The coating washed off easily and cleanly.

EXAMPLE 2

A wax emulsion was prepared in every way identical with the emulsion described in Example 1 except that the 50 lbs. of Sobenite were replaced by 67.5 lbs. of the amino-based corrosion inhibitor known as "Edwin Cooper E010." A wax emulsion was produced having generally similar properties to that described in Example 1.

In addition, this emulsion was sprayed onto the stanchions used to support a motor car. After the emulsion had dried, the car was spray-painted. Considerable quantities of paint were applied to the stanchions. After the motor car had been removed, it was found that the paint could easily be stripped from the stanchions as a result of its lack of adhesion to the wax coating.

EXAMPLE 3

Using a similar procedure to that described in Example 1, an emulsion was prepared comprising:

| | Percent |
|---|---|
| Paraffin wax (melting point 55° C.) | 33 |
| Ethylan LD | 1 |
| Ethylan 77 | 3 |
| 1% aqueous solution of Sobenite | 63 |

The properties of this were generally similar to the properties of the emulsion of Example 1, except that the applied coating was slightly softer.

EXAMPLE 4

An emulsion was prepared comprising:

| | Percent |
|---|---|
| Paraffin wax (melting point 55° C.) | 33 |
| Ethylan LD | 1 |
| Ethylan 77 | 3 |
| Titanium dioxide | 0.25 |
| 1% aqueous solution of Sobenite | 62.75 |

The coating produced by applying this to a substrate was generally similar to a coating produced using the emulsion of Example 3, except that the applied coating had a slightly "milky" appearance and could be more readily seen than could the coating produced from the emulsion described in Example 3.

EXAMPLE 5

An emulsion was prepared comprising:

| | Percent |
|---|---|
| Paraffin wax (melting point 55° C.) | 33 |
| Ethylan LD | 1 |
| Ethylan 77 | 3 |
| Asbestine | 1 |
| 1% aqueous solution of Sobenite | 62 |

Williams' Water Green: 2 parts/1000,000.

A coating produced from this emulsion was generally similar to the coating described in Example 4 except that it had a light green colour.

EXAMPLE 6

An emulsion was prepared comprising:

| | Percent |
|---|---|
| Paraffin wax (melting point 55° C.) | 33 |
| Ethylan LD | 1 |
| Ethylan 77 | 3 |
| Asbestine | 1 |
| Catafour O6 (ethoxylated amine) | 0.25 |
| 1% aqueous solution of Sobenite | 61.75 |

Williams' Water Red: 2 parts/100,000.

The purpose of the Catafour O6 was to assist the dispersion of the Asbestine. This was generally similar to the emulsion of Example 5 except that it had a light red colour.

EXAMPLE 7

Using a method generally similar to that described in Example 1, except that the benzyl benzoate was dissolved in the paraffin wax an emulsion was prepared comprising:

| | Percent |
|---|---|
| Paraffin wax (melting point 55° C.) | 30 |
| Ethylan LD | 3 |
| Ethylan CA | 2 |
| Benzyl benzoate | 1 |
| Water | 64 |

This was very similar in its properties to the emulsion of Example 3.

EXAMPLE 8

An emulsion was prepared comprising:

| | Percent |
|---|---|
| Paraffin wax (melting point 55° C.) | 22.5 |
| Nibren 88 | 7.5 |
| Ethylan LD | 3 |
| Ethylan CA | 2 |
| Benzyl benzoate | 1 |
| Water | 64 |

This was generally similar to the emulsion of Example 7, except that it produced a slightly harder coating.

EXAMPLE 9

An emulsion was perpared comprising:

| | Percent |
|---|---|
| Paraffin wax (melting point 55° C.) | 55 |
| Polyethylene glycol 400 monolaurate | 15 |
| Ethylan LD | 3 |
| Morpan CHSA | 0.5 |
| 1% aqueous solution of Sobenite | 26.5 |

This emulsion was extremely viscous and could only be applied with difficulty. Once applied, it left a thick coat which could, however, be easily removed using an aqueous alkali of pH 10–12.

The emulsions described in Examples 3 to 9 were all used to coat the inside of a container for rubber latex and latex stored in that container was found in every case to be free from discolouration.

The wax emulsion may be applied to the substrate, e.g. to the inside surfaces of the containers, by brushing, spraying or rolling, although spraying techniques will not generally be suitable for higher viscosity emulsions, such as that produced in Example 9. If the humidity of the ambient atmosphere is too great, forced air circulation within the coated containers may be used in order to assist the drying of the emulsion. However, once the emulsion has set, the humidity of the air has no effect upon it. The coating produced is easily removable by means of aqueous alkaline solutions, such as alkaline-type detergents. However, the coating cannot be removed by even mildly acidic water, such as rainwater.

It is desirable that a substantially continuous coat of the wax emulsion should be applied to all contents-contacting surfaces of the container. In general, it will be applied to the floor, the side walls and the roof, since the latex will often splash onto the roof when it is charged into the tank. However, if desired only the floor and side walls may be coated and it will be appreciated that the extent of the coating must be decided for the conditions of each individual case.

The wax emulsion may be applied at any time before the latex is loaded into the tank. For example, it may be applied directly after the tank has been cleaned following a previous unloading. This enables the tank's surface to be kept clean and it makes it possible to clean the tank immediately after unloading rather than immediately before reloading.

The precise components of the emulsion should be chosen depending upon the atmospheric conditions in the part of the world in which the emulsion is intended to be used. In hot climates, a higher viscosity emulsion is more usable than would be suitable for colder climates. If it is necessary to reduce the viscosity, this may be done by raising the temperature of the wax emulsion to 65–70° C. and adding water at the same temperature.

All parts and percentages herein are by weight.

I claim:

1. A method of protecting and inhibiting corrosion of a metal surface to be contacted with a sensitive material such as latex comprising applying to said surface an aqueous emulsion having a continuous aqueous phase, said emulsion consisting of paraffin wax as the dispersed phase and wherein the ratio of the paraffin wax to the aqueous phase is from 3:1 to 1:10 and a non-ionic emulsifying agent in a relative weight ratio of paraffin wax to the emulsifier of from 2:1 to 10:1, and a water-soluble corrosion inhibtor wherein the weight ratio of the corrosion inhibitor to the aqueous phase is not less than 1:200, and removing the aqueous phase thereby leaving on the surface a macroscopically continuous paraffin wax coating which is easily removable by contact with an aqueous alkaline solution having a pH greater than 7.

2. The method of claim 1, wherein the wax is normally solid.

3. The method of claim 1 wherein the emulsion also contains a bactericide.

4. The method of claim 3, wherein the weight ratio of bactericide to water is from 1:500 to 1:5,000.

5. The method of claim 1, wherein the emulsion also contains a fungicide.

6. The method of claim 5, wherein the weight ratio of fungicide to water is from 1:500 to 1:5,000.

7. The method of claim 1, wherein a polyethylene oxide is added to the emulsion in a weight ratio of polyethylene oxide to emulsion of from 1:100 to 1:450.

8. The method of claim 7, wherein the weight ratio of wax to water is 1:2.6, the weight ratio of corrosion inhibitor to water is 1:71 and the weight ratio of bactericide to water is 1:3,530.

9. The method of claim 1, wherein the emulsion also contains a pigment.

10. The method of claim 1 wherein the emulsion also contains a filler.

11. A method as in claim 1 wherein said wax is a paraffin was having a melting point between 30° C. and 100° C., wherein said emulsifying agent is selected from the group consisting of polyethylene glycol-fatty alcohol condensates, polyethylene glycol esters of fatty acids, polypropylene glycol esters of fatty acids, and polyoxyethylene glycol ether, and wherein the aqueous alkaline solution has a pH between 8 and 12.

References Cited

UNITED STATES PATENTS

| | | | |
|---|---|---|---|
| 3,086,871 | 4/1963 | Sheldahl et al. | 106—14 |
| 3,432,319 | 3/1969 | Jakaitis et al. | 106—271 X |
| 2,011,309 | 11/1959 | Rudel et al. | 106—14 |
| 2,934,235 | 4/1960 | Maneri | 117—97 X |
| 2,453,880 | 11/1948 | Vanderbilt et al. | 220—64 |

OTHER REFERENCES

Schwartz et al.: "Surface Active Agents and Detergents," vol. II, Interscience Publishers Inc., N.Y., TP 149 53 (pp. 50–585 relied on).

JOAN B. EVANS, Primary Examiner

U.S. Cl. X.R.

106—271; 117—97, 135, 168; 220—64; 252—388